Dec. 10, 1929.  A. E. BRONSON  1,739,286
QUICK DETACHABLE NUT
Filed June 4, 1923
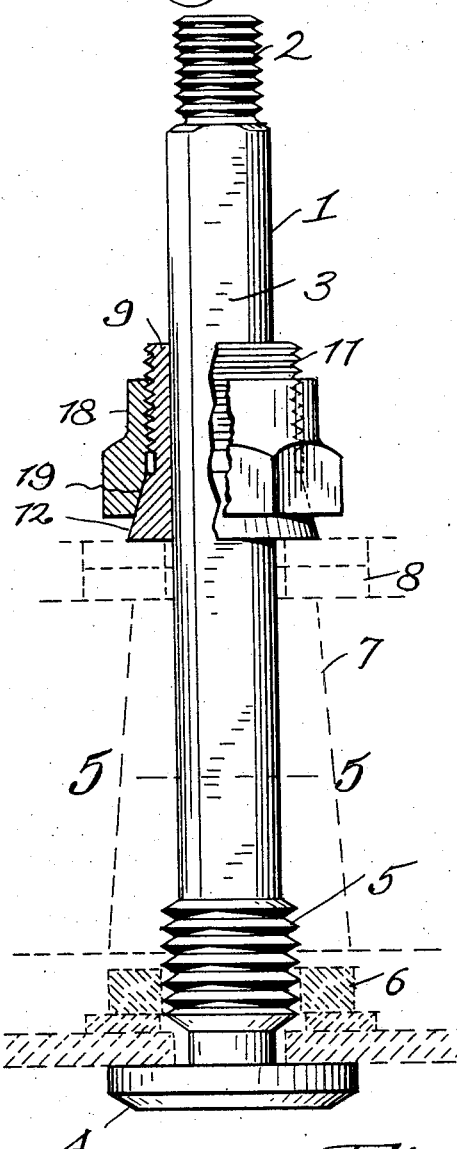
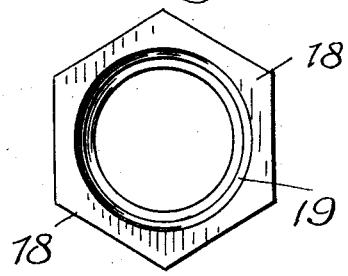
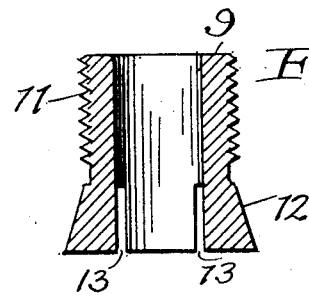
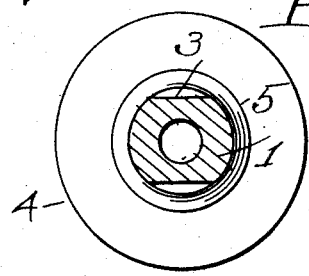
Inventor
Adelbert E. Bronson
By Thurston Kwis & Hudson
Attorneys Patented Dec. 10, 1929

1,739,286

UNITED STATES PATENT OFFICE

ADELBERT E. BRONSON, OF CLEVELAND, OHIO, ASSIGNOR TO THE DILL MANUFACTURING COMPANY, OF CLEVELAND, OHIO, A CORPORATION OF OHIO

QUICK DETACHABLE NUT

Application filed June 4, 1923. Serial No. 643,219.

The present invention relates to a quick detachable nut which is more particularly intended for use in connection with a valve stem for pneumatic tires.

Reference should be had to the accompanying drawings forming a part of this specification, in which Fig. 1 is an elevation with portions in section showing a valve stem and a nut of the present invention co-operating therewith; Fig. 2 is a bottom plan view of a movable nut which forms a part of the quick detachable nut; Fig. 3 is a sectional elevation of a gripping portion for the detachable nut; Fig. 4 is a bottom plan view of the showing in Fig. 3; Fig. 5 is a section substantially on the line 5—5 of Fig. 1.

Referring to the drawings 1 indicates a valve stem which at its upper end has a reduced threaded extension 2 adapted to receive a valve cap of usual construction.

The body of the valve stem is for the most part plain and free from threads, and comprises what may be described as a rounded surface with oppositely disposed flat areas, such as indicated at 3.

At that portion of the valve stem which is adjacent the head 4 there is a short surface which is threaded, as indicated at 5. The valve stem is threaded at the portion 5 for the purpose of receiving a nut, such as indicated at 6, by which the valve stem is secured to the inner tube.

The illustration in Fig. 5 represents the valve stem as extending through the rim of a vehicle, as may be represented at 7, and upon the outside surface of the rim there is a customary washer, such as indicated at 8, against which a portion of the rim nut is adapted to engage.

The rim nut proper comprises two parts, which may be generally indicated at 9 and 18. The part 9 is a hollow tubular member which upon a portion of its outer surface is provided with screw threads, as indicated at 11. The lower portion of the member 9 has an outwardly slanting wall part which is indicated at 12, this slanting surface extending annularly around the member 9. The lower portion of the member 9 is provided with slots which are indicated at 13, which in effect divides the lower portion into four distinct parts, which are indicated at 14, 15, 16 and 17.

These four parts which have just been mentioned are effective to grip the outer surface of the valve stem when suitable pressure is brought against the outside of these members, as will be presently described.

Co-operating with the member 9 is a nut member 18 which has an inner threaded opening that is adapted to engage with threads 11 on the member 9. This nut member 18 at the lower portion of the central opening is provided with an outwardly slanting surface 19 which is complementary to the surface 12 on the member 9. When the nut member 18 is mounted upon the member 9 and turned downwardly the slanting surface 19 engaging with the surface 12 of the member 9 will push the portions 14, 15, 16, 17, of the member 9 inwardly, causing them to bind upon the outer surface of the stem 1.

In order to prevent turning movement of the member 9 upon the stem 1 the central opening through the member 9 is provided with rounded portions and with flat portions which correspond with the flat and round portions on the stem 1. The portions 14 and 15 have their inner surfaces rounded, while the inner surfaces of the portions 16 and 17 are flat, and when the member 9 is mounted upon the stem 1 this member is so positioned that the flat surfaces of the member 9 engage with the flat surfaces on the stem 1, and the round surfaces on the member 9 engage with the round surfaces upon the stem 1.

It will be apparent from the description which has been given that with the nut member 18 in elevated position with respect to the member 9, the member 9 may be moved to any desired position upon the stem 1, and then upon the turning of the nut 18 the gripping action between the lower extending portions on the member 9 and the surface of the stem may be effected so as to hold the structure described in its definite placed position upon the stem 1.

Having described my invention, I claim—

A quick detachable nut comprising a tubular member having slots formed in the lower portion thereof, thereby dividing the lower portion of the tubular member into distinct sections, one pair of oppositely disposed sections being provided with an inner rounding wall and the other pair of oppositely disposed sections having a flat inner wall, the outer surfaces of all of said sections being slanting, the outer surfaces of a portion of said tubular member being provided with threads, and a nut member mounted upon the threads just mentioned, said nut being formed with a slanting surface at one end thereof and adapted to engage with the slanting outer surface of the said sections whereby they may be moved inwardly as the nut is advanced upon the threaded portion of the tubular member.

In testimony whereof, I hereunto affix my signature.

ADELBERT E. BRONSON.